United States Patent
Chen et al.

(10) Patent No.: US 8,281,059 B2
(45) Date of Patent: Oct. 2, 2012

(54) ELECTRONIC DEVICE HAVING PROJECTION FUNCTIONALITY

(75) Inventors: Chin-Jung Chen, Tainan County (TW); Yung-Yuan Ho, Tainan County (TW); Chia-Cheng Lai, Tainan County (TW)

(73) Assignee: Himax Display, Inc., Tainan Science-Based Industrial Park, Tainan (TW)

( * ) Notice: Subject to any disclaimer, the term of this patent is extended or adjusted under 35 U.S.C. 154(b) by 517 days.

(21) Appl. No.: 12/604,406

(22) Filed: Oct. 23, 2009

(65) Prior Publication Data

US 2010/0105431 A1    Apr. 29, 2010

Related U.S. Application Data

(60) Provisional application No. 61/108,860, filed on Oct. 27, 2008.

(51) Int. Cl.
*G06F 13/14* (2006.01)
*G06F 13/36* (2006.01)

(52) U.S. Cl. ............ 710/305; 710/308; 710/313
(58) Field of Classification Search ............ 710/305
See application file for complete search history.

(56) References Cited

FOREIGN PATENT DOCUMENTS
CN    1560753 A    1/2005

*Primary Examiner* — Ryan Stiglic
(74) *Attorney, Agent, or Firm* — Winston Hsu; Scott Margo (57) ABSTRACT

An electronic device with a projection functionality includes: a universal serial bus (USB) port, a processing circuit, a storage, a storage controller and a display circuit. The USB port receives USB packets carrying a first pixel data. The processing circuit is coupled to the USB port, and converts the received USB packets into the first pixel data. The storage controller is coupled between the processing circuit and the storage, and stores the first pixel data into the storage. The display circuit is coupled to the storage controller, and generates a display driving signal according to the first pixel data stored in the storage.

10 Claims, 8 Drawing Sheets

ELECTRONIC DEVICE HAVING PROJECTION FUNCTIONALITY

CROSS REFERENCE TO RELATED APPLICATIONS

This application claims the benefit of U.S. Provisional Application No. 61/108,860, filed on Oct. 27, 2008, which is incorporated herein by reference.

BACKGROUND OF THE INVENTION

1. Field of the Invention

The present invention relates to an electronic device having projection functionality, and more particularly, to a video projector apparatus equipped with a universal serial bus (USB) interface to thereby receive USB packets from a USB port.

2. Description of the Prior Art

For increasing the usage convenience in daily life, the trend of electronic devices is towards lighter weight and more versatile functionality. A video projector apparatus is a projector for projecting an image on a projection screen. The conventional video projector is usually equipped with a D-sub 25-pin interface (video graphics array (VGA) interface) which is bulky, and the conventional video projector technology is therefore unfavorable for modern portable video projectors of reduced size.

Compared to the conventional interfaces, universal serial bus (USB) technology is a connection type with increasing popularity. The USB technology was firstly designed for computers, but now the USB technology has prompted itself to become available to various electronic devices. In other words, there is a trend for applying USB interfaces, especially for those portable electronic devices with size considerations.

Moreover, providing modern electronic devices capable of being used in a wireless manner is another issue for designers. More specifically, providing an electronic device with projection functionality for accomplishing a wireless electronics environment which has a real-time and high-speed connectivity is anticipated. Currently existing wireless video projectors, however, are allowed to project still images only, and fail to display moving pictures (e.g., a film) in a real-time manner due to the restrictions that exist in specifications that the conventional wireless video projector apparatus complies with. As mentioned above, the specification that most existing wireless video projectors comply with is WLAN 802.11a/b/g, where a maximum bandwidth of the WLAN 802.11 a/b/g is restricted to be less than 54M bps, and the existing wireless video projectors are merely suitable for transmitting a still picture data to be displayed. For displaying moving pictures in a real-time manner, the feasible choice at present is to use a conventional video projector having a VGA port for transmitting moving pictures (film) via a VGA interface (i.e., a VGA cable). It is still expected that designers will provide wireless electronic devices with real-time receiving and projection functionality.

In addition, for improving convenience of usage, there is a further trend towards providing modern electronic devices with versatile functionalities implemented therein. For instance, a mobile phone with a projection functionality is well liked. Presently, users are allowed to project the pictures stored in mobile phones that have the projection functionality. However, as mentioned above, even when the mobile phone is equipped with a projecting module for projecting the image data stored therein, it is not convenient to use the mobile phone for this intended purpose due to the large size and limited speed.

Therefore, there is a demand for providing a novel video projector equipped with a connection interface based on USB technology to solve the problems existing in the conventional video projectors/portable video projectors and electronic devices with projection functionality, and further for offering users a better usage environment with high convenience.

SUMMARY OF THE INVENTION

It is therefore one of the objectives of the present invention to solve the aforementioned problems by providing a novel electronic device having projection functionality/video projector apparatus via a USB interface/wireless USB interface to improve the performance/speed of the modern electronic device having the projection functionality.

More specifically, the electronic device having the projection functionality can be built or integrated inside a portable electronic device (e.g., a portable phone device having the projection functionality via USB technology); the electronic device can be equipped with a wireless receiving circuit complying with a wireless universal serial bus (WUSB) standard; the electronic device can be a high speed wired/wireless video projector apparatus with a real-time display capability via a wired/wireless USB interface; the electronic device can be multifunctional and with projection functionality via a wired/wireless USB interface.

According to one exemplary embodiment of the present invention, an electronic device is provided. The electronic device includes a universal serial bus (USB) port, a processing circuit, a storage, a storage controller and a display circuit. The USB port receives USB packets carrying first pixel data. The processing circuit is coupled to the USB port, and converts the received USB packets into the first pixel data. The storage controller is coupled between the processing circuit and the storage, and stores the first pixel data into the storage. The display circuit is coupled to the storage controller, and generates a display driving signal according to the first pixel data stored in the storage.

The foregoing has outlined the features and technical advantages of the present invention in order that the following detailed description of the invention may be better understood. Additional features and descriptions of the present invention will be described hereinafter which form the subject of the claims of the present invention.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following descriptions and claims to refer to particular system components. As one skilled in the art will appreciate, manufacturers may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . " The terms "coupled" and "couples" are intended to mean either an indirect or a direct electrical connection. Thus, if a first device couples to a second device, that connection may be through a direct electrical connection, or through an indirect electrical connection via other devices and connections.

Figure 1:
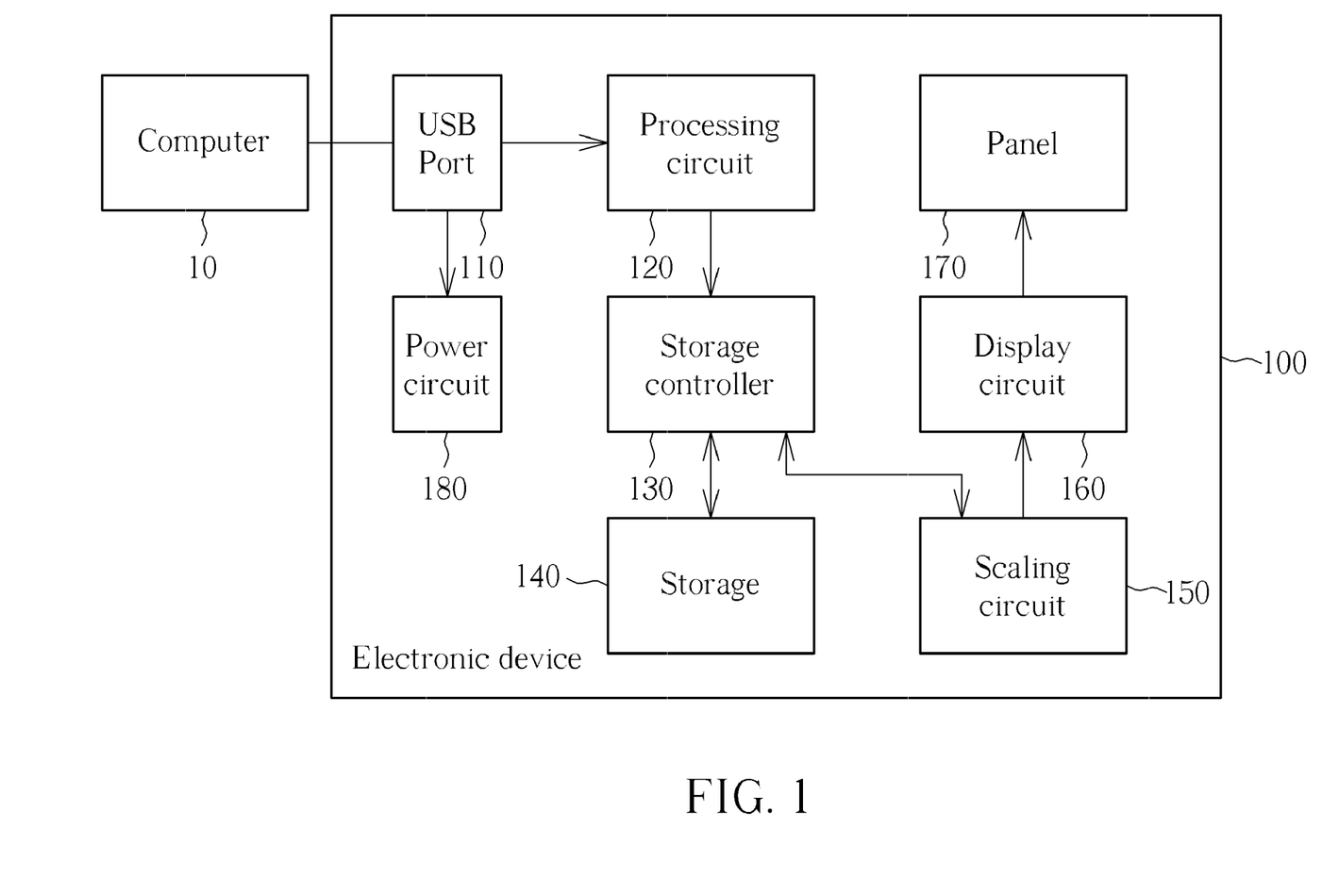
FIG. 1 is a diagram illustrating an electronic device with a projection functionality complying with USB technology according to an exemplary embodiment of the present invention.

Please refer to FIG. 1. FIG. 1 is a diagram illustrating an electronic device 100 with a projection functionality complying with USB technology according to an exemplary embodiment of the present invention. In this exemplary embodiment, the electronic device 100 includes (but is not limited to) a plurality of hardware elements, including a universal serial bus (USB) port 110, a processing circuit 120, a storage controller 130, a storage 140, a scaling circuit 150, a display circuit 160, a panel 170 and a power circuit 180 coupled to the USB port 110. In the following descriptions, the electronic device of the present invention is equipped with a connection interface based on the USB technology (in a wired manner or in a wireless means). When the connection interface of the electronic device complies with the wired USB standard, the electronic device 100 can derive the required power via the USB port 110 and the power circuit 180. That is, the power circuit 180, coupled to the USB port 110, is implemented for receiving external electric power through the USB port 110 and then supplying electric power required by the electronic device 100 according to the received external electric power. In this way, the demanded size of the disclosed electronic device with the projection functionality is further reduced. In addition, when the electronic device 100 complies with the USB standard, the maximum bandwidth allowed will be up to 480 Mbps on USB 2.0, for example.

Figure 2:
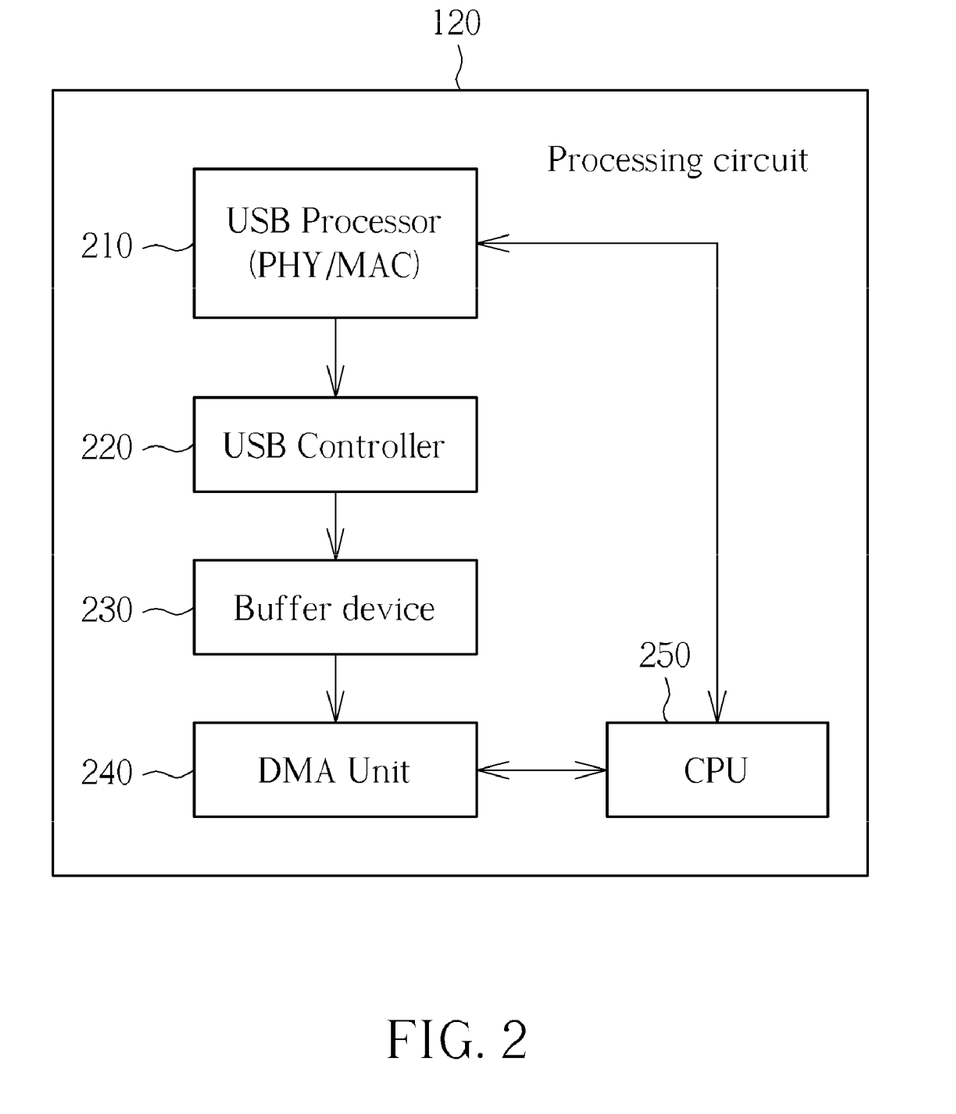
FIG. 2 is a diagram illustrating an exemplary embodiment of the processing circuit in FIG. 1.

Please refer to FIG. 2 in conjunction with FIG. 1. FIG. 2 is a diagram illustrating an exemplary embodiment of the processing circuit 120 shown in FIG. 1. Referring to FIG. 1, the electronic device 100 may be coupled to an external signal source (e.g., a personal computer or a notebook), where for illustrative purposes, the electronic device 100 is exemplarily coupled to a computer 10 for receiving USB packets via the USB port 110 here. The processing circuit 120 is implemented for converting the received USB packets into the pixel data. For instance, as shown in FIG. 2, the processing circuit 120 can be implemented using a USB processing chip, and the processing circuit 120 may include (but is not restricted to) a USB processor 210 for interpreting the received USB packets according to the USB standard. Provided that the electronic device 100 complies with the USB standard, the USB processor 210 can firstly parse the USB packet according to the protocols of the USB technology; specifically, the parsed differential USB signals are processed via the USB processor 210 to be converted into corresponding pixel data (graphic data). However, the electronic device 100 can be allowed to comply with other advanced USB standards according to different design requirements, and these alternative designs obey the spirit of the present invention and fall within the scope of the present invention. In addition, the USB processor 210 further stores the pixel data into a buffer device 230 via a USB controller 220. The buffer device 230 is coupled between the USB controller 220 and a direct memory access (DMA) unit 240, where the DMA unit 240 is coupled to a central processing unit (CPU) 250 for controlling data transfer processes between the USB processor 210 and the buffer device 230, and the DMA unit 240 can further control data transfer processes between the buffer device 230 and the storage controller 130 shown in FIG. 1. The CPU 250 can control the operations of at least the USB processor 210 and the DMA unit 240, and further recognizes the USB information interpreted by the USB processor 210.

Please refer to FIG. 1 again. As mentioned above, the pixel data from the processing circuit 120 is stored into the storage 140 (e.g., a random access memory, such as an SDRAM or DDR memory) via the arbitrations of the storage controller 130. In this exemplary embodiment the electronic device 100 is equipped with a scaling functionality via the scaling circuit 150. Since, in most cases, the pixel data carried on the received USB packets does not have a best resolution corresponding to the panel 170, the scaling circuit 150 can dynamically adjust the resolution of the pixel data when needed.

Figure 3:
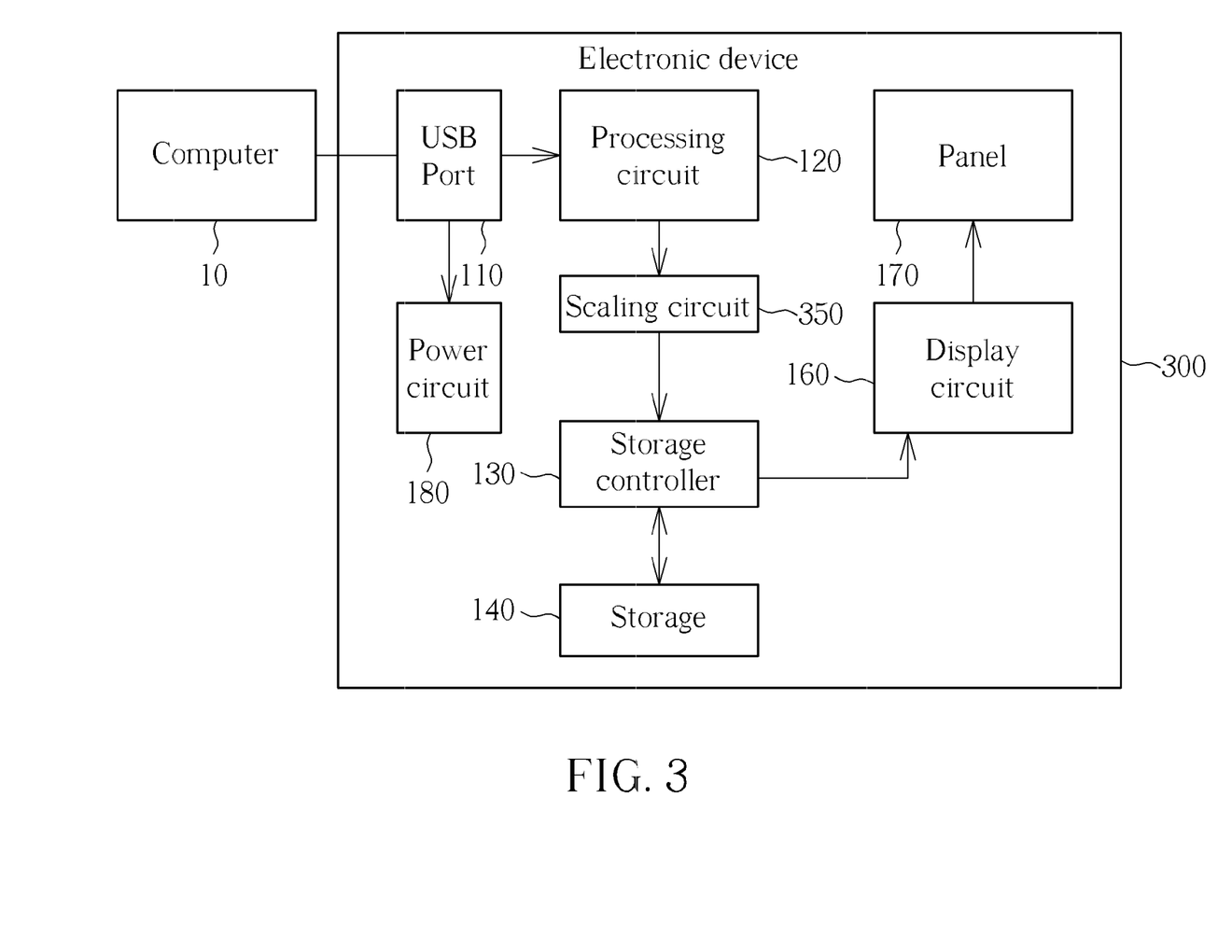
FIG. 3 is a diagram illustrating another exemplary embodiment of the electronic device of the present invention.

Please note that the configuration in FIG. 1 is for illustrative purposes only and is not meant to be a limitation to the scope of the present invention. For instance, the scaling circuit 150 can be disposed in different locations. An alternative design of the electronic device 100 of the present invention is illustrated in FIG. 3. In FIG. 3, the scaling circuit 350 included in the electronic device 300 is coupled to the storage controller 130 for storing the scaled pixel data into the storage 140 via the storage controller 130. Since the configuration of the exemplary electronic device 300 is identical to the configuration of the exemplary electronic device 100 except for the scaling circuit 350, and the detailed operation and function of the individual elements have been disclosed above, further descriptions directed to the configuration shown in FIG. 3 are omitted here for brevity. In addition, in the present invention, the scaling circuit 150, 350 can be equipped with an image processing capability to execute image enhancement operations. The aforementioned design variances all fall within the scope of the present invention. Furthermore, the electronic device having the projection functionality in the present invention can also be implemented in a portable device.

The pixel data processed by the scaling circuit 150, 350 are transmitted to a display circuit 160 for following processes. For instance, the display circuit 160 accesses the pixel data stored in the storage 140 and generates the control signals (i.e., display driving signals) corresponding to the pixel data for driving the panel 170 to perform the projection operation. In other words, the panel 170 acts as a projector module for projecting an image according to the display driving signal generated from the display circuit 160.

The scaling circuit 150, 350 can perform the scaling operation upon the pixel data to satisfy the resolution requirement. For example, if the pixel data carried on the received USB package from the external source (e.g., computer 10) is much larger than the required resolution corresponding to the panel 170, the scaling circuit 150, 350 accomplishes the down-scale function for the pixel data to meet the resolution requirement. Otherwise, the up-scale function can be performed if necessary. In this way, the disagreeable side-effects of improper resolution that occur conventionally are avoided.

Figure 4:
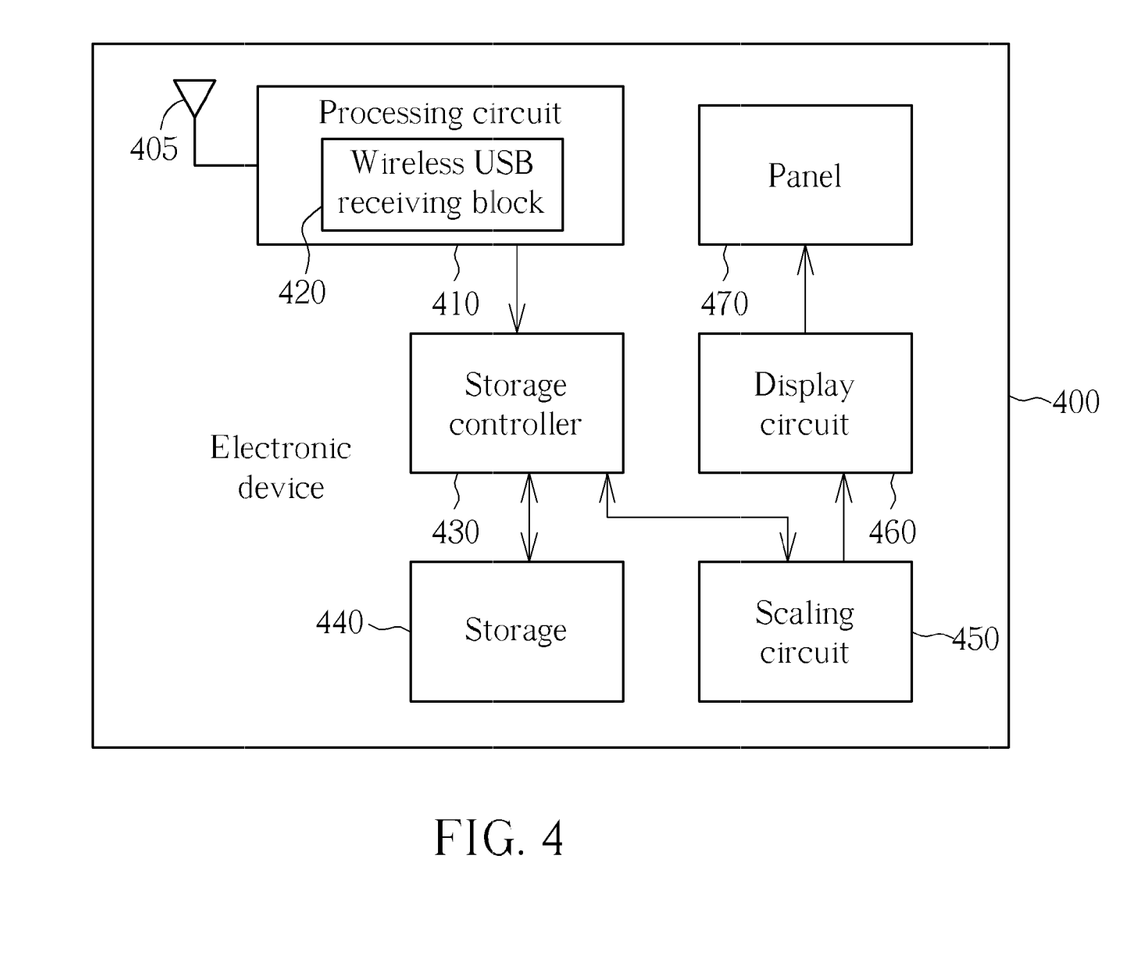
FIG. 4 is a diagram illustrating an exemplary embodiment of an electronic device having projection functionality according to a wireless USB technology.
Figure 5:
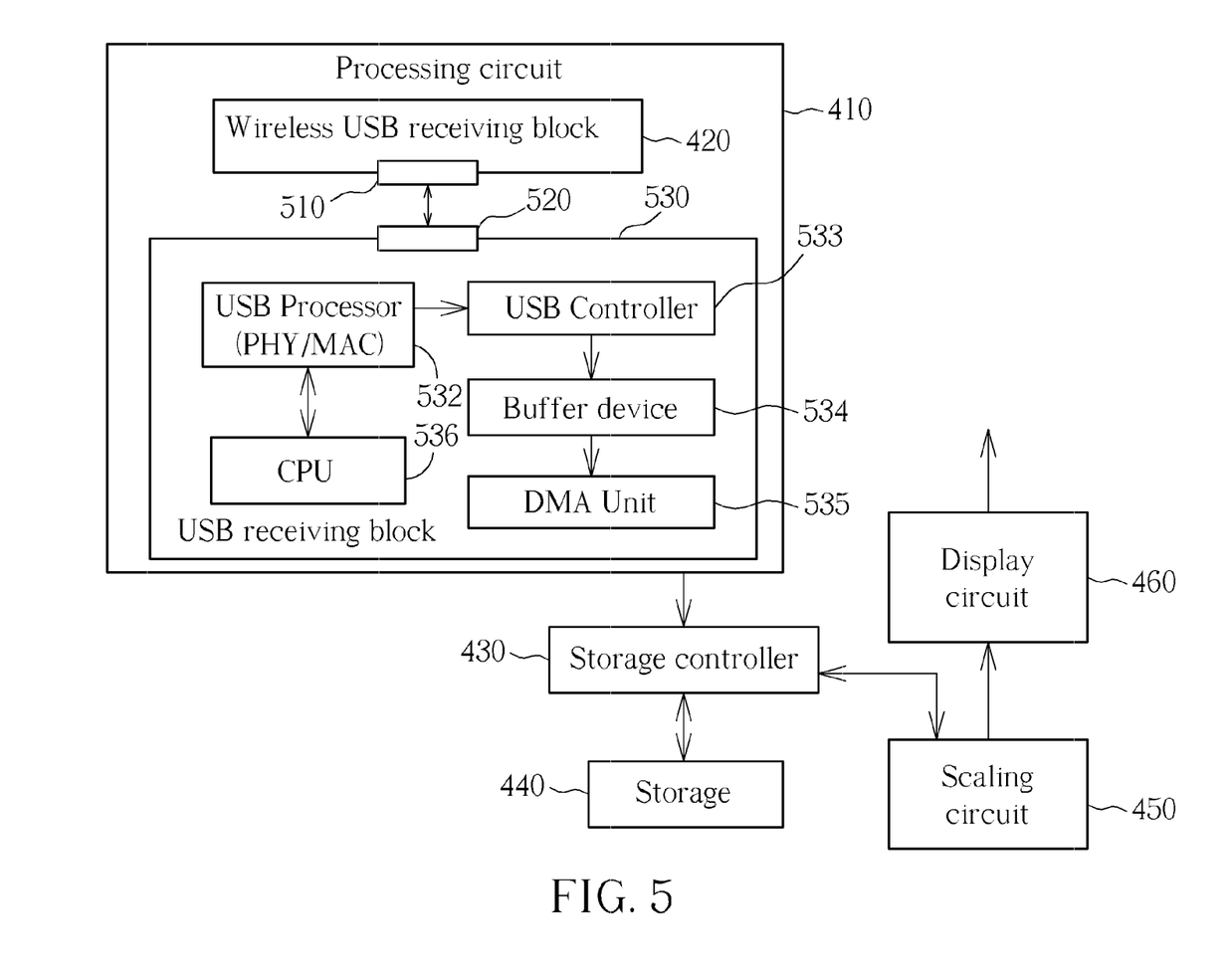
FIG. 5 is a diagram illustrating an exemplary embodiment of the processing circuit, the storage controller, the storage, the scaling circuit and the display circuit illustrated in FIG. 4.

Please refer to FIG. 4, which shows an exemplary embodiment of an electronic device 400 having the projection functionality via a wireless USB interface. In this exemplary embodiment, the electronic device 400 receives wireless USB signals via an antenna 405. The electronic device 400 is exemplarily equipped with a plurality of hardware elements, including a processing circuit 410, a storage controller 430, a storage 440, a scaling circuit 450, a display circuit 460, and a panel 470. The processing circuit 410 has a wireless universal serial bus (WUSB) receiving block 420, and thereby is allowed to convert the received wireless USB signal into pixel data. Referring to FIG. 5 in conjunction with FIG. 4, an exemplary embodiment of the processing circuit 410, the storage controller 430, the storage 440, the scaling circuit 450 and the display circuit 460 in FIG. 4 is shown. The exemplary processing circuit 410 may include a wireless USB (WUSB) receiving block 420 for converting the received wireless USB signal into the USB packages, and a USB processing block 530. Herein the wireless USB receiving block 420 can be equipped with a first USB port 510 for coupling to a second USB port 520 of the USB processing block 530 to receive the USB packages generated from wireless the USB receiving block 420. In some cases, the USB processing block 530 can be implemented using a USB processing chip as mentioned above. Similarly, the USB processing block 530 can include a USB processor 532, a USB controller 533, a buffer device 534, a DMA unit 535, and a CPU 536 as disclosed above. In the exemplary embodiment in FIG. 5, the WUSB receiving block 420 converts the received radio frequency (RF) signal into the USB packages corresponding to the USB 2.0 standard. The USB processing block 530 can parse the USB packages converted from the received WUSB signals into pixel data, and stores the pixel data into the storage (e.g., a memory) 440 via the storage controller (e.g., a memory controller) 430. In addition, the scaling circuit 450 performs the scaling operation upon the pixel data to satisfy the resolution requirement. After the scaling process in the scaling circuit 450 is done, the display circuit 460 generates driving signals corresponding to the pixel data for driving the panel (not shown in FIG. 5) to perform the projection operation. In other words, the processing circuit 410 executes the data processing operation by applying the USB receiving block 530, for example, complying with the USB 2.0 standard.

Figure 6:
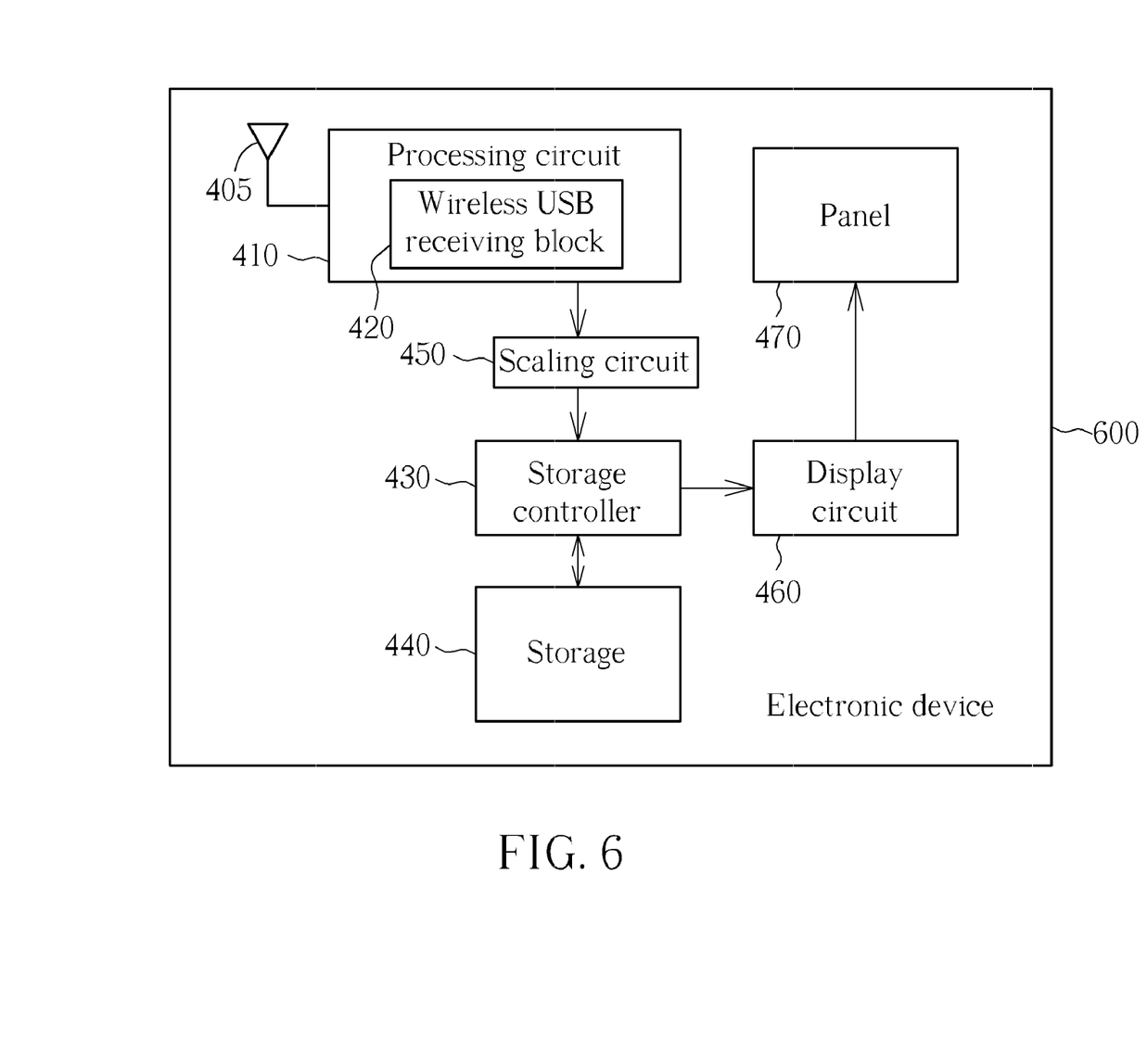
FIG. 6 is a diagram illustrating another exemplary embodiment of the electronic device having projection functionality according to a wireless USB technology.

Please refer to FIG. 6, which shows an alternative design of the electronic device 600 having the projection functionality corresponding to the wireless USB technology. The scaling circuit 450 included in the electronic device 600 is coupled to the storage controller 430 for storing the scaled pixel data into the storage 440 via the storage controller 430. And here, in a preferred embodiment, a scaling operation is performed by the scaling circuit 450 before the pixel data is stored into the storage 440. Since the configuration of the exemplary electronic device 600 is identical to the configuration of the exemplary electronic device 400 except for the scaling circuit 450, and the detailed operation and function of the individual elements have been disclosed above, further descriptions directed to the configuration shown in FIG. 6 are omitted here for brevity.

The processing circuits included in the electronic device employing a wired connectivity and the electronic device employing a wireless connectivity can be implemented using the same USB processing chip; that is, the same USB processing chip can be used to realize the processing circuit 120 in the electronic device 100, 300 adopting the USB technology and the processing circuit 410 in the electronic device 400, 600 adopting the WUSB technology. However, the configuration of the processing circuit 410 in FIG. 5 and FIG. 6 is for illustrative purposes only and is not meant to be a limitation of the present invention; for instance, the electronic device 400 having the projection functionality in a wireless manner can directly convert the received RF signal into pixel data without applying the USB 2.0 interface to serve as a bridge.

Figure 7:
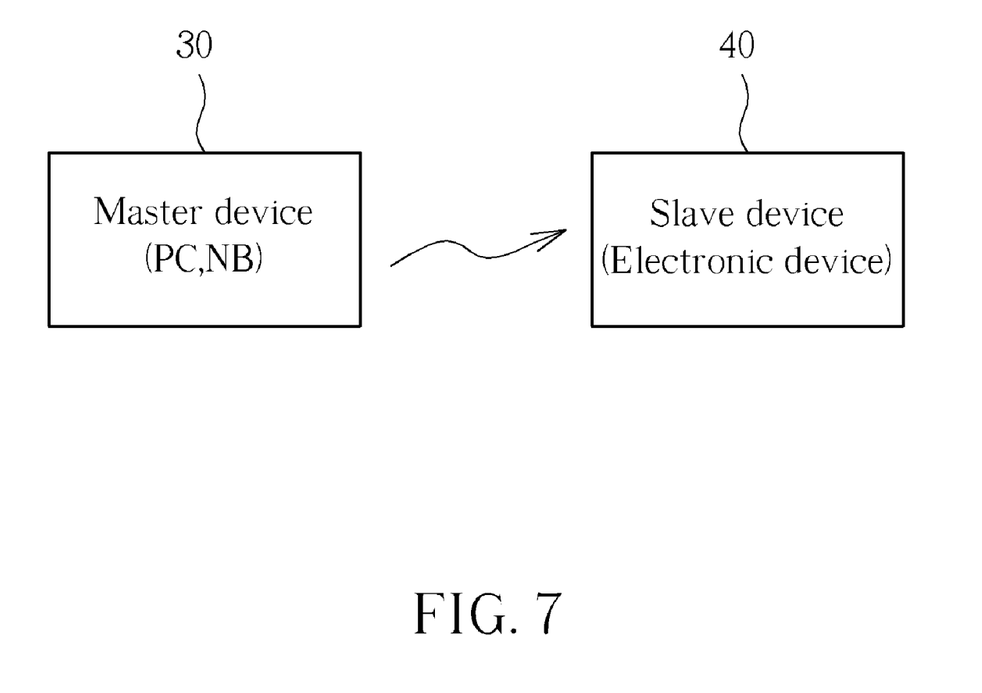
FIG. 7 is an illustrative block of a relation between a slave device and a master device.

Please refer to FIG. 7 in conjunction with FIGS. 4-6. FIG. 7 is an illustrative block of a relation between a slave device 40 and a master device 30. As shown, the slave device 40 can be the electronic device 400, 600 having the projection functionality via the wireless manner which receives the WUSB signals from the master device 30 such as a personal computer (PC) or a notebook (NB). The WUSB technology that the electronic device 400, 600 complies with allows the data bandwidth to be up to 480 Mbps or more. By using the electronic device 400, 600 of the present invention, a (portable) projector having the real-time capability for displaying moving pictures (films) in a wireless manner is accomplished.

Figure 8:
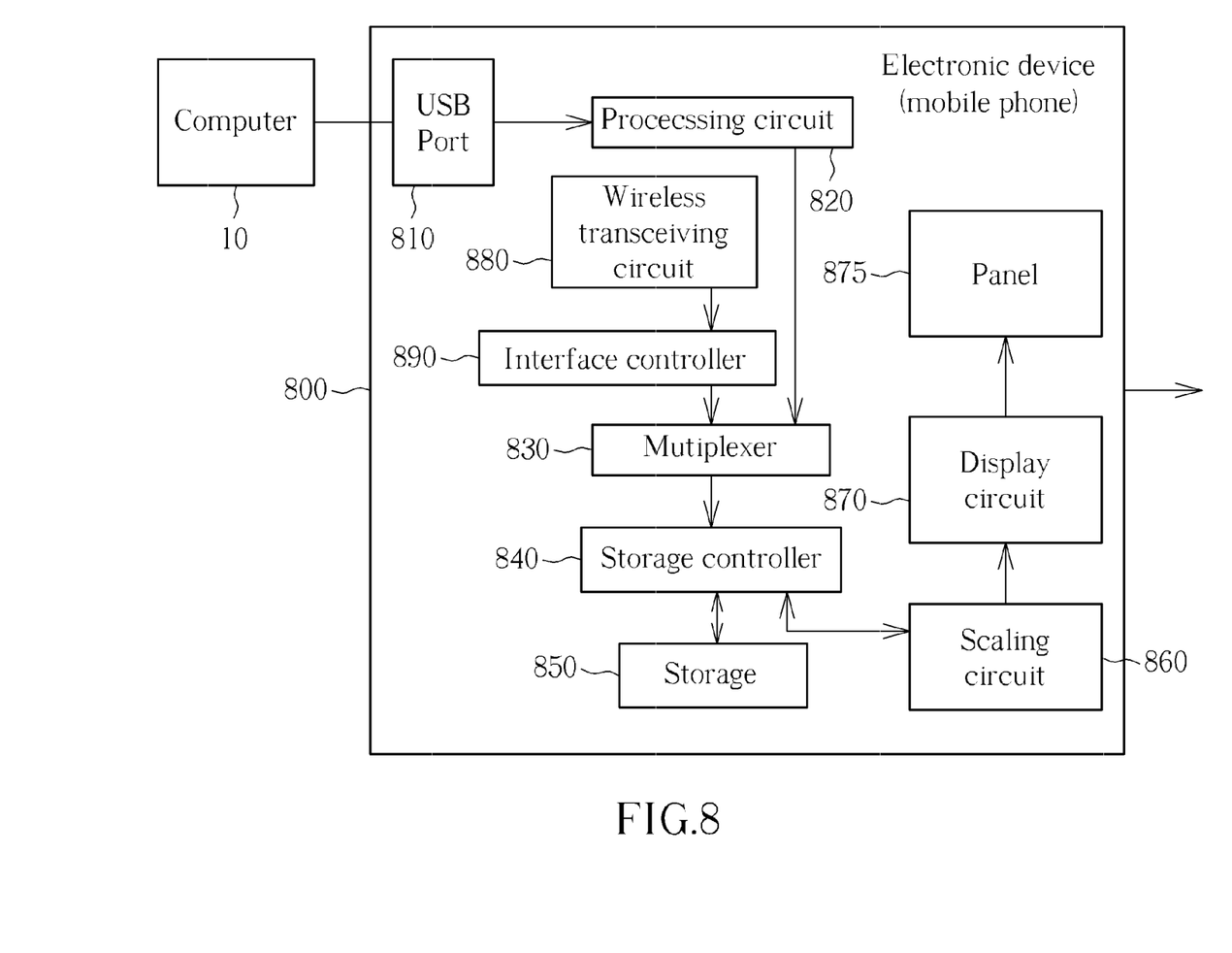
FIG. 8 is a diagram illustrating an electronic device according to an exemplary embodiment of the present invention.

Please refer to FIG. 8, which is a diagram illustrating an electronic device 800 according to an exemplary embodiment of the present invention. The electronic device 800 in FIG. 8 is a mobile phone having the projection functionality via the USB technology. In addition to a plurality of hardware elements, including an USB port 810, a processing circuit 820, a storage controller 840, a storage 850, a scaling circuit 860, a display circuit 870, and a panel (i.e., a projector module) 875. The mobile phone 800 further includes a wireless transceiving circuit 880 and an interface controller 890 for offering the mobile phone functionality. The wireless transceiving circuit 880 can dynamically receive/transmit the cell phone signals from/to an antenna (not shown), and the interface controller 890 can be an I80 interface, an M68 interface, or other suitable interface. The interface controller 890 can interpret the pixel data carried on the cell phone signals, wherein the cell phone signals are wireless communication signals complying with the mobile industry processor interface (MIPI) or Mobile Display Digital Interface (MDDI). Suppose that the pixel data converted from the received packages is denoted as the first pixel data, and the pixel data converted from the cell phone signals via the wireless transceiving circuit 890 and the interface controller 890 is denoted as the second pixel data. The user is then allowed to dynamically control the electronic device (mobile phone) 800 to project images of the first pixel data or the second pixel data via the operations of the multiplexer 830. For example, the multiplexer 830 selectively stores the first pixel data or the second pixel data into the storage 850 according to a user command. Since the operation and function of the wireless transceiving (transmitting and receiving) circuit 880 and the interface controller 890 are well known to people skilled in cell phone technologies, further description is omitted for brevity. In addition, with appropriate design considerations, the CPU inside the processing circuit 820 can also control the operations of a wireless receiving block (including the wireless transceiving circuit 880 and the interface controller 890). This alternative design does not depart from the spirit of the present invention.

By employing the configuration shown in FIG. 8, a mobile phone with a built-in projector whose projection functionality is based on the USB technology is provided.

For a portable video projector, adopting USB technology as the input interface can ease the projection course and further provide required power when needed.

In conclusion, the aforementioned embodiments of the present invention provide electronic devices having a projection functionality based on wired/wireless USB standards. Compared with conventional projectors, the disclosed electronic devices having the projection functionality provide a new choice with reduced size as well as larger bandwidth, and are allowed to be multi-functional.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An electronic device, comprising:
   a universal serial bus (USB) port, for receiving USB packets carrying a first pixel data;
   a processing circuit, coupled to the USB port, for converting the received USB packets into the first pixel data;
   a storage;
   a storage controller, coupled between the processing circuit and the storage, for storing the first pixel data into the storage; and
   a display circuit, coupled to the storage controller, for generating a display driving signal according to the first pixel data stored in the storage;
   wherein the processing circuit comprises:
   a USB processor, coupled to the USB port, for receiving the USB packets from a data source external to the electronic device, and converting the received USB packets into the first pixel data accordingly;
   a buffer device;
   a direct memory access (DMA) unit, coupled to the USB processor, the buffer device, and the storage controller, for controlling data transfer between the USB processor and the buffer device and data transfer between the buffer device and the storage controller; and
   a central processing unit (CPU), coupled to the USB processor and the DMA unit, for controlling operations of the USB processor and the DMA unit.

2. The electronic device of claim 1, further comprising:
   a scaling circuit, coupled to the storage controller, for scaling the first pixel data.

3. The electronic device of claim 1, further comprising:
   a wireless receiving block, for receiving a wireless communication signal carrying a second pixel data, and converting the wireless communication signal into an output signal complying with an interface;
   an interface controller, coupled to the wireless receiving circuit, for decoding the output signal to derive the second pixel data; and
   a multiplexer, coupled to the interface controller, the DMA unit, and the storage, for selectively outputting the first pixel data from the DMA unit or the second pixel data from the interface controller to the storage.

4. The electronic device of claim 3, wherein the interface is mobile industry processor interface (MIPI) or Mobile Display Digital Interface (MDDI).

5. The electronic device of claim 3, wherein the CPU further controls operations of the wireless receiving block.

6. The electronic device of claim 1, further comprising:
   a power circuit, coupled to the USB port, for receiving external electric power through the USB port and supplying electric power required by the electronic device according to the received external electric power.

7. The electronic device of claim 1, wherein the USB packets complies with a USB 2.0 standard.

8. The electronic device of claim 1, further comprising:
   a projector module, coupled to the display circuit, for projecting an image according to the display driving signal.

9. The electronic device of claim 8, being a portable device.

10. The electronic device of claim 9, wherein the portable device is a mobile phone with a built-in projector.

* * * * *